(12) United States Patent
Kim

(10) Patent No.: US 8,670,204 B2
(45) Date of Patent: Mar. 11, 2014

(54) HEAD-DISK INTERFERENCE (HDI) DETECTION

(75) Inventor: Myoung Mee Kim, Seongnam-si (KR)

(73) Assignee: Seagate Technology LLC, Cupertino, CA (US)

(*) Notice: Subject to any disclaimer, the term of this patent is extended or adjusted under 35 U.S.C. 154(b) by 56 days.

(21) Appl. No.: 13/539,214

(22) Filed: Jun. 29, 2012

(65) Prior Publication Data

US 2013/0003217 A1    Jan. 3, 2013

(30) Foreign Application Priority Data

Jun. 30, 2011   (KR) .................. 10-2011-0065095

(51) Int. Cl.
*G11B 5/03*       (2006.01)
(52) U.S. Cl.
USPC ............................. 360/66; 360/68

(58) Field of Classification Search
USPC ............ 360/66, 68, 67, 31, 77.06, 75, 77.04, 360/78.14, 77.08, 78.09
See application file for complete search history.

(56) References Cited

U.S. PATENT DOCUMENTS 7,751,139 B1 *   7/2010   Voo ............................... 360/66

* cited by examiner

*Primary Examiner* — Nabil Hindi
(74) *Attorney, Agent, or Firm* — Hall Estill Attorneys at Law

(57) ABSTRACT

Method and apparatus for detecting head disk interference (HDI). In accordance with some embodiments, a bias calibration circuit is adapted to respectively bypass or amplify a head disk interference (HDI) signal output from an HDI sensor responsive to a bias voltage adjusted according to a first control signal. A detection circuit is adapted to compare a swing range of a signal output from the bias calibration circuit and a swing range of a reference signal, and to output the first control signal responsive to said comparison.

20 Claims, 3 Drawing Sheets

HEAD-DISK INTERFERENCE (HDI) DETECTION

RELATED APPLICATION

The present application makes a claim of foreign priority under 35 U.S.C. §119(a) to Korean Application No. 10-2011-0065095 filed Jun. 30, 2011.

BACKGROUND

When a head and a disk become close or in contact with each other in a hard disk drive (HDD), the head and the disk may be damaged so the head cannot properly process a signal output to the disk. Thus, there may be a problem with quality of the HDD.

SUMMARY

Various embodiments of the present disclosure are generally directed to detecting head-disc interference (HDI), such as in a hard disk drive (HDD).

In accordance with some embodiments, a bias calibration circuit is adapted to respectively bypass or amplify a head disk interference (HDI) signal output from an HDI sensor responsive to a bias voltage adjusted according to a first control signal. A detection circuit is adapted to compare a swing range of a signal output from the bias calibration circuit and a swing range of a reference signal, and to output the first control signal responsive to said comparison.

These and other features and advantages of various embodiments will become more apparent from the following detailed description when read in conjunction with the accompanying drawings.

DETAILED DESCRIPTION

Particular structural or functional descriptions of embodiments according to the present disclosure are merely illustrative, and the subject matter of the disclosure may be implemented in various forms and is not limited to the embodiments described herein.

Figure 1:
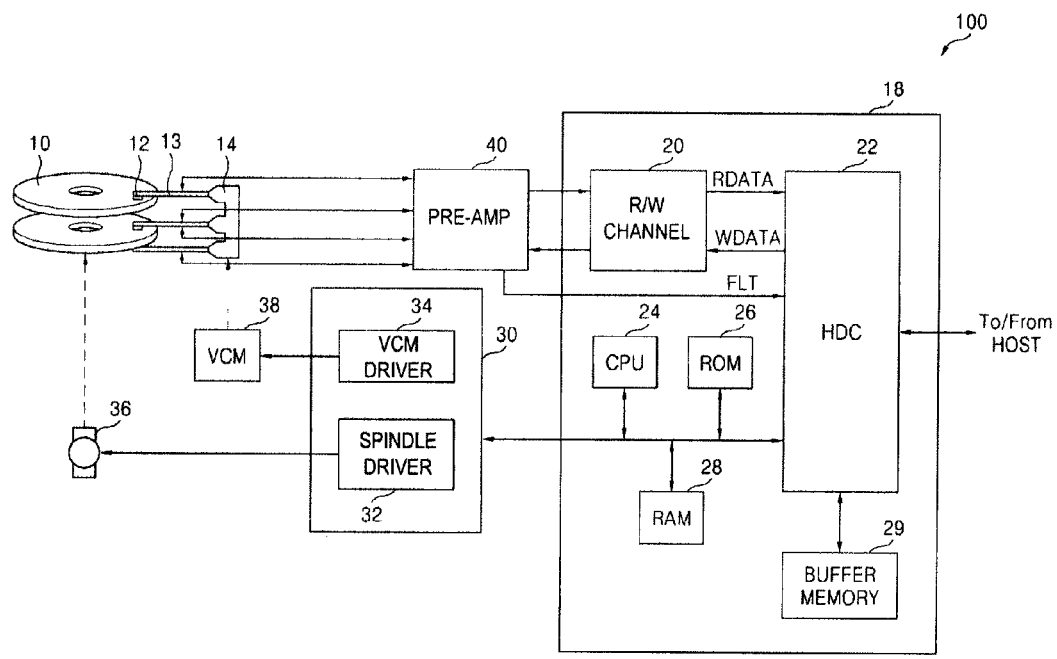
FIG. 1 is a schematic block diagram of a data storage device accordance with some embodiments of the present disclosure.

FIG. 1 is a schematic block diagram of a data storage device according to some embodiments of the present disclosure. The device is characterized as a hard disk drive IOU which includes a plurality of disks 10, a plurality of heads (transducers) 12, a head assembly 14, a pre-amplifier 40, a circuit block 18, a motor control block (or servo control block) 30, a spindle motor 36, and a voice coil motor (VCM) 38.

Each of the plurality of disks 10 may store data and are rotated by the spindle motor 36. Each of the plurality of heads 12 is positioned over a corresponding hard disk among the plurality of disks 10 to perform a reading operation or a writing operation and installed in support arms 13 extending toward the plurality of disks 10 from the head assembly 14 coupled to the voice coil motor 38.

When data stored any one of the plurality of disks 10 is read, the pre-amplifier 40 amplifies a read signal output from a read head (12-1 in FIG. 2) implemented in any one of the plurality of heads 12, and outputs the amplified read signal to the read/write channel circuit 20. Or, the pre-amplifier 40 outputs an HDI fault signal FLT to the hard disk controller 22.

When data is written to any one of the plurality of disks 10, the pre-amplifier 40 transmits a write signal, e.g., a write current, output from the read/write channel circuit 20, to any one of the plurality of heads 12. Thus, the write head (12-2 in FIG. 2) implemented in an one of the heads may write the write signal to any one of the plurality of disks 10.

The read/write channel circuit 20 converts the read signal which has been amplified by the pre-amplifier 40 into read data RDATA, and outputs the read data RDATA to the hard disc controller (HDC) 22. Also, the read/write channel circuit 20 write data WDATA output from the hard disk controller 22 into a write signal, and outputs the write signal to the pre-amplifier 40.

When data is written to any one of the plurality of disks 10, the hard disk controller 22 outputs write data output from a host to the read/write channel circuit 20 under the control of the CPU 24. Thus, the write data output from the host may be written to any one of the plurality of disks 10 through the read/write channel circuit 20, the pre-amplifier 40, and a corresponding head.

When data is read from the plurality of disks 10, the hard disk controller 22 may receive the data RDATA decoded by the read/write channel circuit 20 and transmit the received read data to the host through an interface under the control of the CPU 24.

The CPU 24 may read a control code or a boot code stored in a ROM (read only memory) 26 and store the same in a RAM (random access memory) 28, and generally control an operation of the hard disk drive 100 or the hard disk controller 22 based on the control code or the boot code stored in the RAM 28. Thus, the CPU 24 may control a read operation or write operation of the hard disk drive 100.

The CPU 24 may receive a read command or a write command output from the host through each interface connected to a bus, and control a servo controller for controlling an operation of a spindle motor driving unit 32 and a VCM driving unit 34 in order to control track seek or track following according to a received command.

In response to the control signal output from the hard disk controller 22, the spindle motor driving unit 32 controls an operation of the spindle motor 36 for controlling rotation of the plurality of disks 10.

In response to a control signal for controlling a position of each of the plurality of heads 12 output from the hard disk controller 22, the VCM driving unit 34 generates a driving current for driving the voice coil motor 38 and outputs the same to a voice coil of the voice coil motor 38.

Thus, the voice coil motor 38 moves the plurality of heads 12 over a track implemented in any one of the plurality of disks 10 storing data desired to be read from the plurality of disks 10 according to a direction and level of the driving current. The head 12 moved by the voice coil motor 38 outputs position information recorded on any one of the plurality of disks 10 to the pre-amplifier 40 according to a control signal output from the read/write channel circuit 20 or under the control of the hard disk controller 22.

When the head 12 moves to a target track of any one of the plurality of disks 10, a disk formatter (not shown) of the hard disk controller 22 outputs a servo gate signal to the read/write channel circuit 20.

The read/write channel circuit 20 reads a servo pattern recorded in the plurality of disks 10 in response to the servo gate signal.

A buffer memory 29 may temporarily store data exchanged between the hard disk drive 100 and the host. In a different embodiment, the buffer memory 29 may be implemented outside the circuit block 18.

According to an embodiment, the circuit block 18 including the read/write channel circuit 20, the hard disk controller 22, the CPU 24, the ROM 26, and the RAM 28 may be implemented as a single chip, e.g., an SoC (System on Chip). Also, the motor control block 30 including the spindle motor driving unit 32 and the VCM driving unit 34 may be implemented as a single chip, e.g., an SoC.

Figure 2:
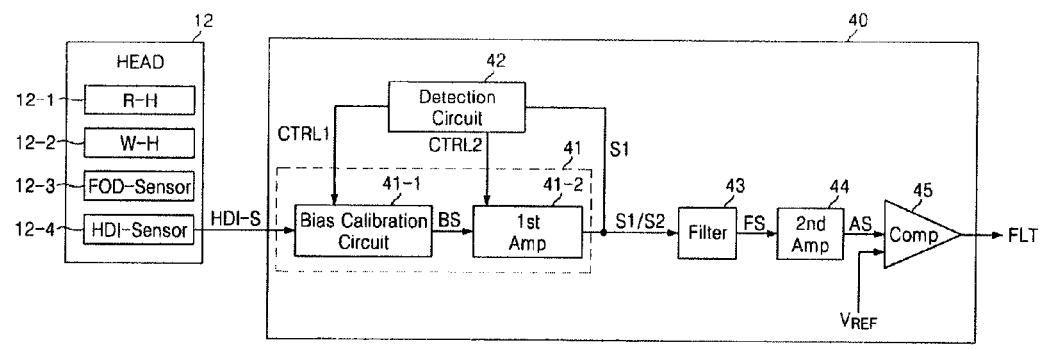
FIG. 2 is a schematic block diagram of a pre-amplifier illustrated in FIG. 1.
Figure 3:
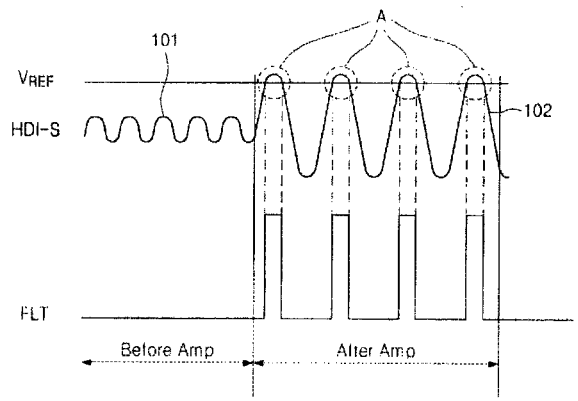
FIG. 3 is a view illustrating a process of outputting an HDI fault signal according to an operation of the pre-amplifier illustrated in FIG. 2.

FIG. 2 is a schematic block diagram of a pre-amplifier illustrated in FIG. 1, and FIG. 3 is a view illustrating a process of outputting an HDI fault signal according to an operation of the pre-amplifier illustrated in FIG. 2.

In FIG. 2, a single head 12 is illustrated for the convenience of explanation. The head 12 includes a read head 12-1, a write head 12-2, an FOD (flying on demand) sensor 12-3, and an HDI (head disk interference) sensor 12-4.

The read head 12-1 indicates an element for reading a read signal from a disk, and the write head 12-2 indicates an element for writing a write signal to a disk.

The FOD (flying on demand) 12-3 is an element for detecting an FOD (flying on demand) voltage signal required for calculating a flying height of the head 12. The HDI (head disk interference) sensor 12-4 is an element for detecting an HDI signal HDI-S including information for detecting whether or not HDI (also referred to as head media interference, HMI) has occurred.

With reference to FIG. 2, the pre-amplifier 40 includes a compensation circuit 41, a detection circuit 42, a filter 43, and a comparator 45. The pre-amplifier 40 may further include a second amplifier 44.

The compensation circuit 41 includes a bias calibration circuit 41-1 and a first amplifier 41-2.

In FIG. 2, the compensation circuit 41 including a bias calibration circuit 41-1 and a first amplifier 41-2 is illustrated as an embodiment of the present disclosure, but the compensation circuit 41 may include any one of the bias calibration circuit 41-1 and the first amplifier 41-2.

When the compensation circuit 41 includes only the bias calibration circuit 41-1, the detection circuit 42 may compare a swing range of an output signal S1 or S2 of the bias calibration circuit 41-1 and a swing range of a reference signal, and generate a first control signal CTL1 having a different value according to the comparison results. Here, the first control signal CTL1 may include 1 bit or more bits. The bias calibration circuit 41-1 may adjust a bias voltage for amplifying an HDI signal HDS-S according to the first control signal CTL1.

When the compensation circuit 41 includes only the first amplifier 41-2, the detection circuit 42 may compare a swing range of an output signal S1 or S2 of the first amplifier 41-2 and the swing range of the reference signal, and generate a second control signal CTL2 having a different value according to the comparison results. Here, the second control signal CTL2 may include 1 bit or more bits. The first amplifier 41-2 may adjust a gain for amplifying an HDI signal HDS-S according to the first control signal CTL1.

As illustrated in FIG. 2, the bias calibration circuit 41-1 may bypass the HDI signal HDS-S output from the head 12, e.g., the HDI sensor 12-4, in response to the first control signal CTL1, e.g., the first control signal having a first value, output from the detection circuit 42, or may amplify the HDI signal HDS-S output from the HDI sensor 12-4 and transmit the amplified HDI signal to the first amplifier 41-2 in response to the first control signal CTL1 having a second value.

The first amplifier 41-2 may bypass the signal BS output from the bias calibration circuit 41-1 in response to the second control signal CTL2, e.g., the second control signal CTL2 having a third value, output from the detection circuit 42, or may amplify the signal BS output from the bias calibration circuit 41-1 in response to the second control signal CTL2 having a fourth value.

The detection circuit 42 compares the swing range of the output signal S1 or S2 from the first amplifier 41-2 with the swing range of the reference signal, and when the swing range of the output signal S1 or S2 is equal to or greater than the swing range of the reference signal, the detection circuit 42 may output the first control signal having a first value or the second control signal CTL2 having a third value for controlling the compensation circuit 41 to bypass the HDI signal HDI-S.

However, according to the comparison between the swing range the output signal S1 or S2 from the first amplifier 41-2 and the swing range of the reference signal, when the swing range of the output signal S1 or S2 is smaller than the swing range of the reference signal, the detection circuit 42 may output the first control signal CTL1 having a first value or the second control signal CTL2 having a fourth value for controlling the compensation circuit 41 to amplify the HDI signal HDI-S.

According to an embodiment, the first control signal CTL1 and the second control signal CTL2 may be output simultaneously or at a mutually different time.

The filter 43 filters the first signal S1 or the second signal S2 output from the compensation circuit 41 to output a filtered signal FS. For the convenience of explanation, the first signal S1 will be referred to as a 'bypassed signal' (or "non-amplified signal") by the compensation circuit 41 and the second signal S2 will be referred to as an 'amplified signal' by the compensation circuit 41.

For example, when the swing range of the HDI signal HDI-S, namely, the first signal S1, output from the HDI sensor 12-4 is greater than the swing range of the reference signal, the HDI signal HDI-S, namely, the first signal S1, is bypassed by the compensation circuit 41. However, when the swing range of the HDI signal HDI-S, namely, the first signal S1, output from the HDI sensor 12-4 is equal to or smaller than the swing range of the reference signal, the HDI signal HDI-S, namely, the first signal S1, is amplified to the second signal S2 by the compensation circuit 41. He the swing range may refer to a peak-to-peak of a subject signal.

The second amplifier 44 amplifies the signal FS output from the filter 43, and transmits the amplified signal AS to the comparator 45.

As shown in FIG. 3, the comparator 45 compares the signal AS amplified by the second amplifier 44 and a reference voltage signal VREF, and when the amplified signal AS is greater than the reference signal VREF, the comparator 45 outputs an HDI fault signal FLT.

For example, 101 denotes the HDI signal HDI-S output from the HDI sensor 12-4, namely, the HDI signal HDI-S before being amplified by the compensation circuit 41, and 102 denotes the HDI signal HDI-S amplified by the compensation circuit 41.

When the swing range of the HDI signal HDI-S is equal to or smaller than the swing range of the reference signal, the comparator 45 outputs the HDI fault signal FLT having a low level.

However, although the swing range of the HDI signal HDI-S output from the HDI sensor 12-4 is smaller than the swing range of the reference signal, since the compensation circuit 41 sequentially amplifies the HDI signal HDI-S by using the control signals CTRL1 and CTRL2 output from the detection circuit 42 and outputs the amplified signal 102, the comparator 45 may output the HDI fault signal FLT having a high level. For example, the comparator 45 may output the HDL fault signal FLT having a high level in portions A in which the level or the amplified signal 102 is greater than the level a the reference voltage signal VREF.

Figure 4:
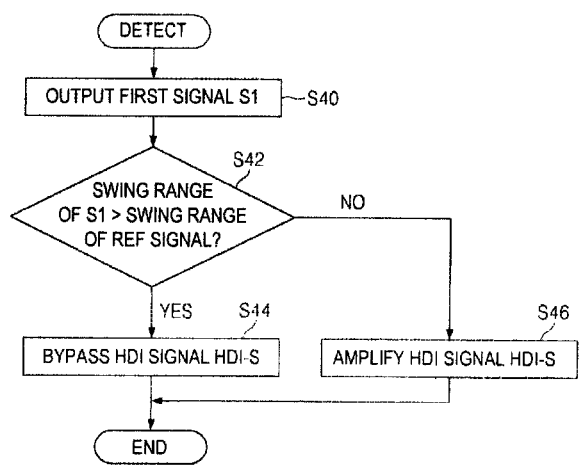
FIG. 4 is a flow chart illustrating a detection method of operating the pre-amplifier illustrated in FIG. 2.

FIG. 4 is a flow chart illustrating a detection (detect) method of operating the pre-amplifier illustrated FIG. 2.

With reference to FIGS. 1 through 4, the compensation circuit 41 outputs the first signal S1 (S40).

The detection circuit 42 compares the swing range of the first signal S1 output from the compensation circuit 41 with the swing range of the reference signal, and generates the first control signal CTRL1 and the second control signal CTRL2 (S42).

For example, when the swing range of the First signal S1 output from the compensation circuit 41 is greater than the swing range of the reference signal (YES), the detection circuit 42 generates the first control signal CTRL1 having a first value and the second control signal CTRL2 having a third value. Thus, the bias calibration circuit 41-1 and the first amplifier 41-2 bypass the HDI signal HDI-S output from the HDI sensor 12-4, respectively (S44).

However, when the swing range of the first signal S1 output from the compensation circuit 41 is equal to or smaller than the swing range of the reference signal (NO), the detection circuit 42 generates the First control signal CTRL1 having a second value and the second control signal CTRL2 having a fourth value. Thus, since the bias voltage of the bias calibration circuit 41-1 and the gain of the first amplifier 41-2 an adjusted, the bias calibration circuit 41-1 and the first amplifier 41-2 amplify the HDI signal HDI-S output from the HDI sensor 12-4 and output the amplified second signal 62 (S46).

Subsequently, the bias voltage-adjusted bias calibration circuit 41-1 and the gain-controlled first amplifier 41-2 amplify the HDI signal HDI-S output from the HDI sensor 12-4, the swing range of the second signal S2 output from the compensation circuit 41 is grater than the swing range of the reference signal. Thus, the detection circuit 42 generates the first control signal CTRL1 having a first value and the second control signal CTRL2 having a third value, so, the adjusted bias voltage of the bias calibration circuit 41-1 and the adjusted gain of the first amplifier 41-2 are maintained as is.

Figure 5:
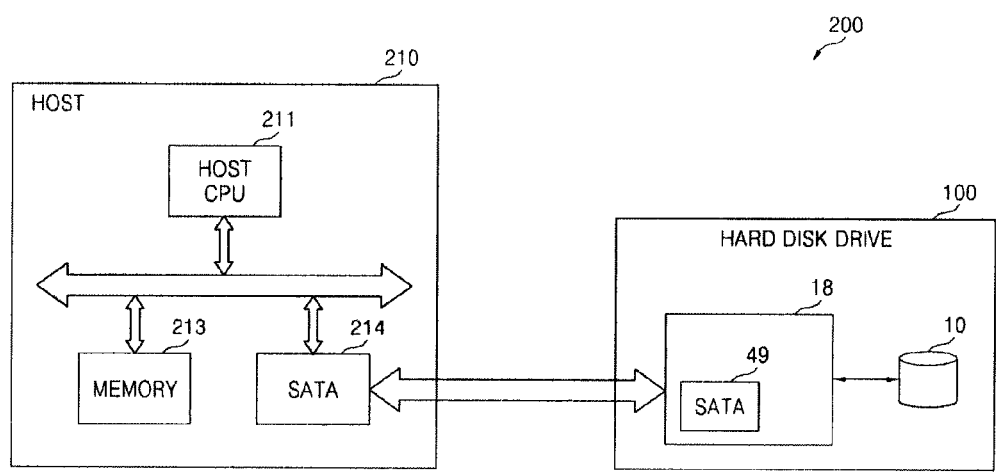
FIG. 5 is a schematic block diagram of a computer system including the device in FIG. 1.

FIG. 5 is a schematic block diagram of a computer system including the hard disk drive illustrated in FIG. 1.

With reference to FIGS. 1 through 5, a computer system 200 that may be implemented as a personal computer (PC) or a laptop computer may include a hard disk drive 100 and a host 210 for exchanging data with the hard disk drive 100.

The host 210 includes a host CPU 211, a memory 213, and an interface 214. The host CPU controls an operation of the host 210, and during a write operation, the host CPU 211 may transmit data output from the memory 213 to a host interface 49 implemented in a circuit block 18 of the hard disk drive 100 through an interface 214.

The interface 214 and the host interface 49 may be implemented as a SATA interface. Thus, the interface 214 and the host interface 49 may exchange data by using a SATA protocol.

During a read operation, the interface 214 may store data transmitted from the host interface 49 implemented in the circuit block 18 of the hard disk drive 100, in a memory 213 under the control of the host CPU 211.

The host CPU 211 may process the data stored in the memory 213, e.g., display the data by using a display device, or may output the data by using a printer connected to a peripheral device, e.g., a USB port.

Particular embodiments of the present disclosure have been illustrated and described. However, as the embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims.

What is claimed is:

1. An apparatus comprising:
a bias calibration circuit adapted to respectively bypass or amplify a head disk interference (HDI) signal output from an HDI sensor responsive to a bias voltage adjusted according to a first control signal; and
a detection circuit adapted to compare a swing range of a signal output from the bias calibration circuit and a swing range of a reference signal, and to output the first control signal responsive to said comparison.

2. The apparatus of claim 1, wherein when the swing range of the signal output from the bias calibration circuit is equal to or greater than the swing range of the reference signal, the bias calibration circuit bypasses the HDI signal in response to the first control signal output from the detection circuit, and when the swing range of the signal output from the bias calibration circuit is smaller than the swing range of the reference signal, the bias calibration circuit amplifies the HDI signal in response to the first control signal output from the detection circuit.

3. The apparatus of claim 1, further comprising:
a filter adapted to filter the signal output from the bias calibration circuit; and
a comparator adapted to compare an output signal from the filter with a reference voltage signal, and to output an HDI fault signal when the output signal from the filter is greater than the reference voltage signal.

4. The apparatus of claim 1, further comprising a first amplifier adapted to bypass or amplify the signal output from the bias calibration circuit based on a gain adjusted according a second control signal, wherein the detection circuit compares a swing range of a signal output from the first amplifier and the swing range of the reference signal and outputs the second control signal according to said comparison.

5. The apparatus of claim 4, wherein when the swing range of the signal output from the first amplifier is equal to greater than the swing range of the reference signal, the first amplifier bypasses the signal output from the bias calibration circuit in response to the second control signal output from the detection circuit, and when the swing range of the signal output from the first amplifier is smaller than the swing range of the reference signal, the first amplifier amplifies the signal output from the bias calibration circuit in response to the second control signal output from the detection circuit.

6. The apparatus of claim 4, further comprising:
a filter adapted to filter the signal output from the first amplifier; and a comparator adapted to compare the output signal of the filter with a reference voltage signal, and to output an HDI fault signal when the output signal of the filter is greater than the reference voltage signal.

7. The apparatus of claim 6, further comprising a second amplifier connected between the filter and the comparator.

8. The apparatus of claim 1, further comprising a transducing head adjacent a data storage surface, the HDI signal generated responsive to an instantaneous fly height of the head with respect to the surface.

9. The apparatus of claim 1, further comprising an HDI sensor which generates the HDI signal responsive to an instantaneous fly height of a data transducer with respect to a data storage surface.

10. An apparatus comprising:
a data transducing head adjacent a data storage surface;
a head-disk interface (HDI) sensor coupled to the head adapted to generate an HDI signal responsive to a potential contact event between the head and the surface;
a bias calibration circuit adapted to respectively bypass or amplify the HDI signal responsive to a first control signal; and
a detection circuit adapted to compare a swing range of a signal output from the bias calibration circuit and a swing range of a reference signal, and to output the first control signal responsive to said comparison.

11. The apparatus of claim 10, wherein when the swing range of the signal output from the bias calibration circuit is equal to or greater than the swing range of the reference signal, the bias calibration circuit bypasses the HDI signal in response to the first control signal output from the detection circuit, and when the swing range of the signal output from the bias calibration circuit is smaller than the swing range of the reference signal, the bias calibration circuit amplifies the HDI signal in response to the first control signal output from the detection circuit.

12. The apparatus of claim 10, further comprising a first amplifier adapted to bypass or amplify the signal output from the bias calibration circuit based on a gain adjusted according to a second control signal, wherein the detection circuit compares a swing range of a signal output from the first amplifier and the swing range of the reference signal and outputs the second control signal according to said comparison.

13. A method comprising:
generating a head disk interference (signal) responsive to a potential contact event between a data transducer and a data storage surface;
generating a first control signal responsive to a swing range of the HDI signal and a swing range of a reference signal;
bypassing the HDI signal responsive to a first control signal having a first value; and
amplifying the HDI signal responsive to the second control signal having a second value.

14. The method of claim 13, further comprising:
comparing the bypassed or amplified HDI signal to a reference voltage; and
transmitting an HDI fault signal responsive to said comparison.

15. The method of claim 14, further comprising adjusting an operation of the data transducer responsive to the transmitted HDI fault signal.

16. The method of claim 13, further comprising filtering the bypassed or amplified HDI signal.

17. The method of claim 13, in which the bypassing step comprises transmitting a signal to an amplifier to not apply amplification to the HDI signal, and in which the amplifying step comprises transmitting a signal to the amplifier to apply amplification to the HDI signal.

18. The method of claim 17, further comprising applying filtering to an output of the amplifier.

19. The method of claim 18, further comprising using a second amplifier to amplify an output of the filter.

20. The method of claim 19, further comprising using a comparator to compare an output of the filter to a reference voltage, and transmitting an output of the comparator to a controller.

* * * * *